United States Patent [19]

Goebel

[11] 4,372,038
[45] Feb. 8, 1983

[54] METHOD FOR ASSEMBLING AN ELECTROCHEMICAL CELL

[75] Inventor: Franz Goebel, Sudbury, Mass.

[73] Assignee: GTE Products Corporation, Stamford, Conn.

[21] Appl. No.: 286,217

[22] Filed: Jul. 23, 1981

[51] Int. Cl.³ ............................................. H01M 2/06
[52] U.S. Cl. ................................. 29/623.2; 29/623.1; 29/432; 29/458
[58] Field of Search ................. 29/623.1, 623.2, 623.5, 29/432, 458; 429/101, 105, 128, 161, 163, 164, 169, 196, 211, 94

[56] References Cited

U.S. PATENT DOCUMENTS

| | | | |
|---|---|---|---|
| 3,116,172 | 12/1963 | Wilke et al. | 429/128 |
| 4,154,905 | 5/1979 | Urry | 429/101 |
| 4,309,819 | 1/1982 | Goebel | 29/623.1 |

Primary Examiner—Lowell A. Larson
Assistant Examiner—Jonathan L. Scherer
Attorney, Agent, or Firm—Peter Xiarhos

[57] ABSTRACT

A method for assembling a primary electrochemical cell including a carbon cathode structure. An anode structure, a porous separator and an elongated porous carbon element are arranged concentrically with respect to each other and positioned within an elongated housing of an electrochemical cell. The porous carbon element has a guide opening extending therealong for a portion of its entire length. A generally V-shaped, tapered, resilient, unitary metal current collector element is secured to a feedthrough member/cover assembly of the cell and introduced into the guide opening of the porous carbon element. The current collector element is then pushed, using the cover for this purpose, along the guide opening of the carbon element and then beyond the termination of the guide opening whereby the current collector element penetrates the material of the carbon element and becomes embedded within the carbon element. The current collector element is dimensioned relative to the guide opening in the carbon element so as to exert, when embedded within the carbon element, an outwardly directed force against internal portions of the carbon elements and the other internal components of the cell.

14 Claims, 6 Drawing Figures

METHOD FOR ASSEMBLING AN ELECTROCHEMICAL CELL

CROSS-REFERENCE TO RELATED APPLICATION

In co-pending application Ser. No. 286,212 now U.S. Pat. No. 4,435,085, filed concurrently herewith in the name of Franz Goebel, and entitled "ELECTROCHEMICAL CELL", there is disclosed and claimed a carbon cathode structure for an electrochemical cell assembled in accordance with the method disclosed and claimed in the present application.

BACKGROUND OF THE INVENTION

The present invention relates to a method for assembling an electrochemical cell and, more particularly, to a method for assembling a primary electrochemical cell having a carbon cathode structure.

Primary electrochemical cells are utilized for a wide variety of applications and are commonly available in a large assortment of sizes and shapes. Furthermore, a number of electrochemical systems are known for incorporation into such primary electrochemical cells. Many of these electrochemical cells utilize a carbon cathode structure. By way of example, in U.S. Pat. No. 4,060,668, in the name of Franz Goebel and assigned to GTE Laboratories Incorporated, there is disclosed an electrochemical system including an anode, a carbon current collector cathode structure, and an electrolytic solution in contact with the anode and the carbon current collector cathode structure. The carbon current collector cathode structure employed in this electrochemical system includes a preformed porous cylindrical carbon structure of a specified length (as determined by the size of the cell), and a twisted metal cathode current collector impressed into and along the carbon structure. One end of the twisted current collector, which protrudes out of the carbon structure, is welded to a feedthrough provided in a cover of the cell. The carbon structure comprises an aggregation of a large number of porous semi-rigid globules which are pressed together in a manner to define a multiplicity of electrolyte-conducting channels. By virtue of these channels, the electrolytic solution can diffuse throughout the porous carbon structure and contact the cathodic particles of the structure.

While carbon current collector cathode structures as described hereinabove can be constructed and successfully employed within electrochemical cells, they nonetheless are subject to numerous possible problems and disadvantages. More particularly, the preformed porous carbon structures are inherently fragile and susceptible to breaking or falling apart when a twisted metal cathode current collector is inserted into the preformed carbon structure, either by twisting or forcing the metal cathode current collector longitudinally into the preformed carbon structure. In addition, the impressing of the twisted current collector into the carbon structure cannot be controlled with great accuracy, especially in positioning and guiding the current collector into and along the center of the carbon structure. As a result, the mechanical and electrical contact between the twisted metal cathode current collector and the preformed carbon structure may be inadequate to satisfy the stringent requirements and specifications of the electrochemical cell in which such structure is to be used.

Carbon current collector cathode structures of alternative design are described in U.S. Pat. No. 4,154,906. The carbon current collector cathode structures disclosed in this patent comprise two or more elongated arcuate carbon bodies which are mechanically biased outwardly by means of a metal member positioned intermediate to, or embedded within, the carbon bodies. The metal member may variously take the form of a coil disposed within an axial opening between the carbon bodies or physically embedded within the carbon bodies, a U-shaped spring strip disposed between or embedded within the carbon bodies and having a protruding end thereof welded to a cover of the cell, or a U-shaped spring strip embedded within the carbon bodies and having the central portion thereof welded to a cover of the cell.

The various carbon current collector cathode structures as described in U.S. Pat. No. 4,154,906 generally have the disadvantage of being difficult to manufacture, especially the embedding of spring members within carbon bodies, and are further difficult to assemble without subjecting the carbon bodies to damage, as by breaking or falling apart.

BRIEF SUMMARY OF THE INVENTION

In accordance with the present invention, a method is provided for assembling a carbon current collector cathode structure for an electrochemical cell which avoids the problem and disadvantages associated with prior art methods as described hereinabove. The method in accordance with the present invention includes the steps of providing an elongated porous carbon element and a unitary metal current collector element. The porous carbon element has a guide opening therein which extends along the porous carbon element for a portion of its entire length. The unitary metal current collector element comprises first and second elongated, spaced-apart, tapered, resilient spring members having a pair of spaced-apart free ends and an opposing pair of ends joined together and defining a tapered central opening between the spring members and a generally V-shaped tapered form for the current collector element.

In accordance with the method of the invention, the free ends of the current collector element are secured to a feedthrough member having a cover attached thereto thereby to provide a rigid assembly jointly with the current collector element. The current collector element is then introduced into the guide opening in the porous carbon element, and the assembly of the cover, the feedthrough member and the current collector element is pushed along the porous carbon element thereby to cause the current collector element to penetrate the material of the carbon element beyond the termination of the guide opening in the carbon element and thereby embed the current collector element within the carbon element. The current collector element is dimensioned relative to the guide opening in the carbon element to exert an outwardly directed force by way of the spring members against internal portions of the carbon element when the current collector element has been embedded within the carbon element.

The steps as described hereinabove may also be used with other steps for assembling an electrochemical cell. In this case, the steps as described hereinabove are preceded by the steps of positioning an anode structure and a porous separator within an elongated housing of the cell and relative to each other and an elongated porous carbon element so that the anode structure is in contact with both the housing and the porous separator and the porous separator is in contact with the porous carbon element. The remaining assembly steps for the porous carbon element, feedthrough member and cover are the same as described hereinabove.

BRIEF DESCRIPTION OF THE DRAWING

Various objects, features and advantages of a method for assembling an electrochemical cell including a carbon cathode structure in accordance with the present invention will be apparent from a detailed discussion taken in conjunction with the accompanying drawing in which.

DETAILED DESCRIPTION OF THE INVENTION

Figure 1:
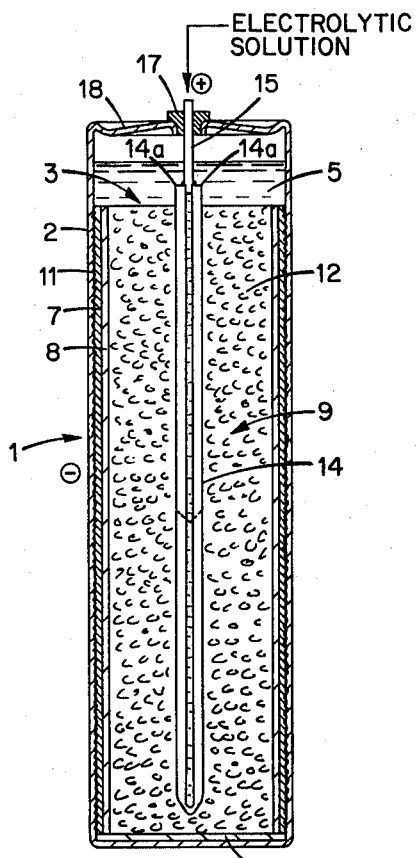
FIG. 1 is an elevational view, partly in cross section, of a primary electrochemical cell employing a carbon cathode structure as assembled in accordance with the method of the present invention.

Referring now to FIG. 1, there is shown a primary electrochemical cell 1 as assembled in accordance with the method of the present invention. As shown in FIG. 1, the electrochemical cell 1 generally includes an elongated metal casing or housing 2, for example, of a cylindrical configuration, within which a battery stack 3 is disposed adjacent to a bottom end thereof. An electrolytic solution 5, for example, in the form of a cathodelectrolyte solution, is provided within the interior of the cell 1 to permeate various portions of the battery stack 3, in a manner to be described in greater detail hereinafter. A suitable and preferred form of the electrolytic solution 5 which is usable with the components of the battery stack 3 (a preferred form of which will be described in greater detail hereinafter) is a cathodelectrolyte solution including a reducible soluble cathode, such as thionyl chloride, and an electrolyte solute, such as lithium tetrachloroaluminate, dissolved in the thionyl chloride.

The battery stack 3 and the electrolytic solution 5 as discussed hereinabove collectively represent the electrochemical system of the cell 1. The battery stack 3 as shown in FIG. 1 is insulated from the housing 2 of the cell 1 by a suitable insulator 6, and generally includes a concentric arrangement of an anode 7, a thin porous separator 8, and a cathode current collector electrode structure 9. The anode 7, which takes the form of a cylindrical sheet and which may be of an oxidizable active alkali metal such as lithium, is connected mechanically and electrically to the housing 2 by means of a fine metal screen or grid 11 which is spot welded to the interior wall of the housing 2 and into which the lithium anode is physically pressed to secure the lithium anode to the screen 11. The electrical connection of the anode 7 to the housing 2 establishes the housing 2, which may be of stainless steel, as the negative terminal for the cell 1.

The aforementioned porous separator 8 is employed to electrically isolate the anode 7 from the cathode current collector electrode structure 9 and typically takes the form of a cylindrical sheet of a standard electrically-nonconductive material such as fiberglass.

The aforementioned cathode current collector electrode structure 9 generally comprises a preformed elongated cylindrical porous carbon element 12, and an elongated, generally V-shaped, pointed, tapered metal current collector element 14 inserted within and along the porous carbon element 12. The current collector element 14 is connected at free ends 14a thereof by a cylindrical, hollow metal feedthrough member 15 spot-welded to the ends 14a of the current collector element 14 and passing through a standard insulative glass or ceramic-to-metal seal 17 provided within an hermetically sealed cap 18 of the cell 1. The free end of the member 15 serves as a positive terminal of the cell 1.

Figure 2:
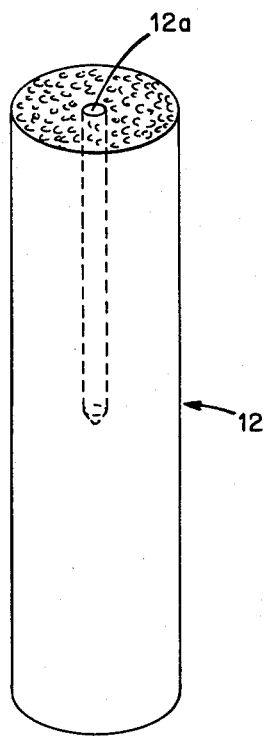
FIGS. 2 and 3 are perspective views, respectively, of a carbon element and a metal current collector element employed by the carbon cathode structure shown in FIG. 1.
Figure 5:
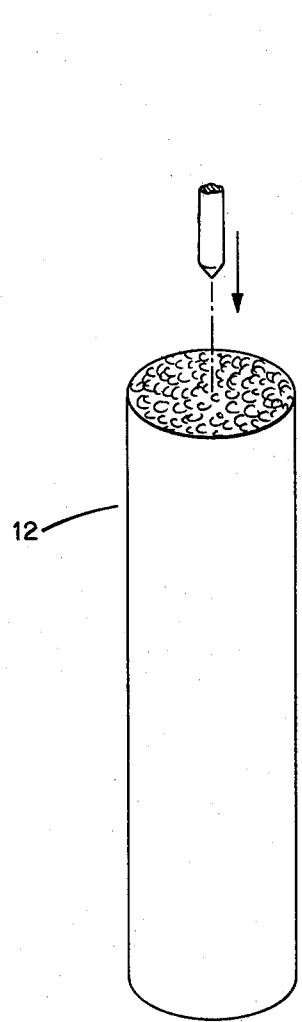
FIGS. 5 and 6 illustrate steps employed in the assembly of the electrochemical cell of FIG. 1 in accordance with the method of the present invention.

The porous carbon element 12, when used with the aforementioned components and specific materials of the cell, acts as a cathode current collector and as a catalyst where the reduction of the solvent (thionyl chloride) in the cathodelectrolyte solution takes place. The element 12, a preferred form of which is shown in FIG. 2, has an opening 12a of circular cross section located centrally therein and extends into the element 12 for a major portion of its length, for example, about half way. The opening 12a in the element 12 serves as a guide for the current collector element 14 for insuring the proper location and centering of the current collector element 14 within the carbon element 12, as will be discussed in greater detail hereinafter. The element 12 is produced by first extruding an aggregation of discrete, semi-rigid, porous carbon conglomerates into a solid cylindrical tube of the desired length, for example, 1½ inch for a "D" sized cell, and then forming the opening 12a therein of the desired depth, for example, ¾ inch. The opening 12a may be formed in the carbon element 12 in any desired fashion, for example, by piercing the carbon element with a pointed metal pin as indicated in FIG. 5. A suitable diameter for the carbon element 12 is 0.4 inch, and a suitable diameter for the opening 12a is up to 0.06 inch.

The conglomerates of the element 12 as described hereinabove generally contain a combination of carbon black, graphite, and a binder such as "Teflon". By virtue of the porous nature of the above ingredients when compressed together, a network of electrolyte-conducting channels are established throughout the carbon element 12 whereby the carbon element 12 can be permeated by the electrolytic solution. Techniques for producing the conglomerates employed by the carbon element 12 are described in detail in U.S. Pat. No. 4,161,063 to which reference may be made for specific details.

Figure 3:
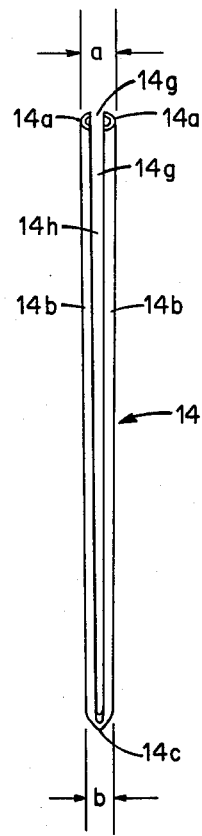
Figure 4:
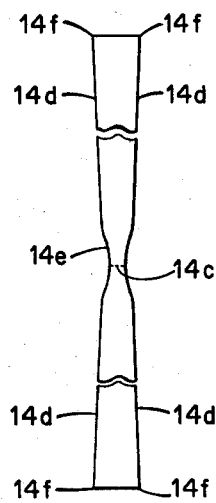
FIG. 4 illustrates a flat metal blank from which the current collector element of FIG. 3 may be formed.

The metal current collector element 14 employed with the carbon element 12 as discussed hereinabove takes the specific form as shown in FIG. 3. As shown in FIG. 3, the current collector element 14, which may be of nickel or stainless steel, is a unitary structure including first and second elongated, generally curved portions 14b joined at first ends thereof along a central bend line 14c. The current collector element 14 may be formed from a generally hourglass-shaped, flat metal blank as shown in FIG. 4 having pairs of opposing side edges 14d tapering toward the center of the blank and having a centrally located necked-down portion 14e. To form the current collector element 14 from the blank, the blank is bent at the bend line 14c and the corners of the blank, shown at 14f in FIG. 4, are bent toward each other, together with the sides of the blank, to form the generally arcuate of curved portions 14b of the current collector element 12. The portions 14b are spaced from each other by gaps or spaces 14g and together serve to define a tapered central opening 14h of a generally conical configuration. By virtue of the tapered side edges 14d and the necked-down central portion 14e of the blank, the current collector element 14 itself assumes a final tapered form or profile and has a sharp, pointed edge at the bend line 14c. Typical top and bottom dimensions for the current collector element 14, shown at "a" and "b" in FIG. 3, are 0.125 inch and 0.100 inch, respectively, and a typical length for the element 14 is approximately 1.5 inch.

Figure 6:
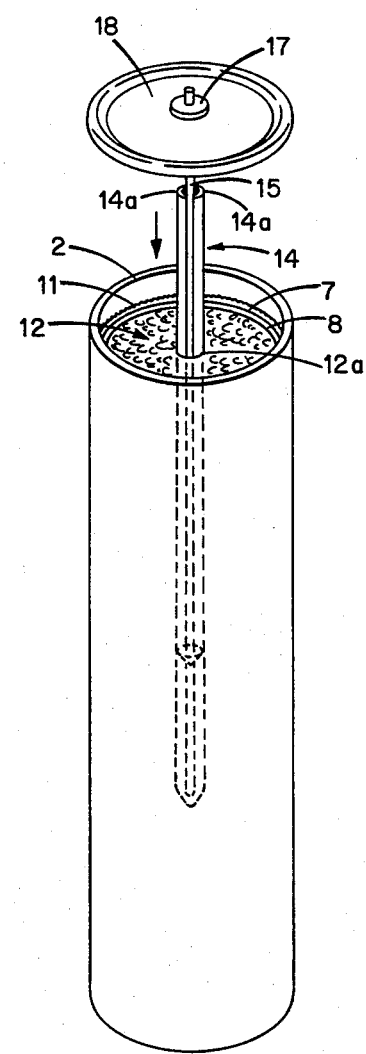

In order to use the current collector element 14 as described hereinabove within the cell 1, the current collector element 14 is first welded at its free ends 14a to the feedthrough member 15. This welding operation, which may be a single step operation, serves to produce a rigid assembly together with the metal feedthrough member 15 and the cap or cover 18 (including the seal 17). Before the current collector element 14 is assembled into the cell, the carbon element 12, the porous separator 8 and the anode 7 (in the grid 11) are assembled with respect to each other in a concentric fashion and positioned within the housing 2 of the cell on top of the insulator 6. The current collector element 14 is then inserted into the central guide opening 12a in the carbon element 12 and, using the cover 18 as a pushing member, pushed along and beyond the end of the opening 12 as generally indicated in FIG. 6 until the current collector element 14 has been completely embedded within the carbon element 12. As the current collector element 14 is pushed beyond the end of the opening 12a in the carbon element 12, the sharp, pointed terminating edge of the current collector element 14, together with the tapered nature of the element 14, acts as a wedge and pushes aside the conglomerates of the carbon element 12. At the same time, the current collector element 14, by virtue of its resilient nature and its dimensioning relative to the opening 12a in the carbon element 12, provides a permanent outwardly-directed spring effect or force for establishing a tight physical fit between the element 14 and the carbon element 12 and the various other internal components of the cell. When the electrolytic solution 5 is added to the cell, specifically, by way of the hollow feedthrough member 15, the tapered central opening 14h and the gaps 14g of the current collector element 14 permit the electrolytic solution to permeate and saturate the carbon element 12, by way of the aforedescribed electrolyte conducting channels formed within the element 12, and also to permeate the porous separator 8. In addition, the electrolytic solution causes the carbon element 12 to expand outwardly, or swell (by up to 20 percent), thereby resulting in a solid, compact battery stack 3 within the cell 1. Further, by virtue of the electrolyte channels in the element 12, the electrolytic solution is able to penetrate the carbon element 12 and contact interior cathodic particles, thereby providing substantial active surface areas for increasing the rate capability and cell discharge capacity of the cell 1.

The battery stack 3 as described hereinabove, including the cathode current collector electrode structure 9, is disclosed and claimed in the aforementioned co-pending application Ser. No. 286,212.

While there has been described what is considered to be a preferred method of the invention, it will be apparent to those skilled in the art that various changes and modifications may be made therein without departing from the invention as called for in the appended claims.

What is claimed is:

1. A method for assembling a carbon current collector cathode structure for an electrochemical cell, comprising the steps of:

providing an elongated porous carbon element having a guide opening extending therealong for a portion of its entire length;

providing a unitary metal current collector element comprising first and second elongated, spaced-apart, tapered, resilient spring members having a pair of spaced-apart free ends and an opposing pair of ends joined together and defining a tapered central opening between the spring members and a generally V-shaped, tapered form for the current collector element;

securing the free ends of the current collector element to a feedthrough member having a cover attached thereto thereby to provide a rigid assembly jointly with the current collector element;

introducing the current collector element into the guide opening in the porous carbon element; and pushing the assembly of the cover, the feedthrough member, and the current collector element along the porous carbon element thereby to cause the current collector element to penetrate the material of the carbon element beyond the termination of the guide opening in the carbon element and thereby embed the current collector element within the carbon element, said current collector element being dimensioned relative to the guide opening in the carbon element to exert an outwardly directed force by way of the spring members against internal portions of the carbon element when the current collector element has been embedded within the carbon element.

2. A method in accordance with claim 1 wherein the step of providing an elongated porous carbon element comprises the steps of:

extruding a compressed aggregation of semi-rigid porous carbon conglomerates into an elongated porous carbon element of a predetermined length; and piercing the porous carbon element to provide a guide opening within and along the porous carbon element for a portion of the entire length of the porous carbon element.

3. A method in accordance with claim 1 wherein the step of providing a unitary metal current collector element comprises the steps of:

providing a flat metal blank of a resilient material and in the general shape of an hourglass, said blank having opposing pairs of corners and opposing pairs of sides tapering toward the center of the blank; and bending the metal blank at the central region thereof to form a pair of elongated spaced-apart, tapered, resilient spring members having spaced-apart free ends and defining a tapered central opening between the spring members and a generally V-shaped tapered form for the current collector element.

4. A method in accordance with claim 3 wherein:

the guide opening in the porous carbon element is generally circular in cross section; and the step of providing the current collector element further comprises the step of:

bending the pairs of corners and sides of the metal blank toward each other in a manner to shape the elongated resilient members into generally arcuate configurations with the resilient members and the free ends of the resilient members being spaced apart from each other by gaps and the resilient members defining a generally conical opening therebetween.

5. A method in accordance with claim 3 wherein:
the feedthrough member is an elongated metal tube; and
the step of securing the free ends in the resilient members includes the step of: welding the free ends of the resilient spring members to one end of the elongated metal feedthrough member.

6. A method in accordance with claim 4 wherein the step of providing an elongated porous carbon element comprises the steps of:

extruding a compreseed aggregation of semi-rigid porous carbon conglomerates into an elongated porous carbon element of a predetermined length; and piercing the porous carbon element to provide a guide opening within and along the porous carbon element for a portion of the entire length of the porous carbon element.

7. A method for assembling an electrochemical cell, comprising the steps of:

positioning an anode structure, a porous separator and an elongated porous carbon element relative to each other and within an elongated housing of an electrochemical cell with the anode structure being in contact with the housing and the porous separator and with the porous separator being in contact with the elongated porous carbon element, said porous carbon element having a guide opening extending therealong for a portion of its entire length;

providing a unitary metal current collector element comprising first and second elongated, spaced-apart, tapered, resilient spring members having a pair of spaced-apart free ends and an opposing pair of ends joined together and defining a tapered central opening between the spring members and a generally V-shaped, tapered form for the current collector element;

securing the free ends of the current collector element to a feedthrough member having a cover attached thereto thereby to provide a rigid assembly jointly with the current collector element;

introducing the current collector element into the guide opening in the porous carbon element; and pushing the assembly of the cover, the feedthrough member, and the current collector element along the porous carbon element thereby to cause the current collector element to penetrate the material of the carbon element beyond the termination of the guide opening in the carbon element and thereby embed the current collector element within the carbon element, said current collector element being dimensioned relative to the guide opening in the carbon element to exert an outwardly directed force by way of the spring members against internal portions of the carbon element when the current collector element has been embedded within the carbon element.

8. A method in accordance with claim 7 wherein the porous carbon element is formed by the steps of:

extruding a compressed aggregation of semi-rigid porous carbon conglomerates into an elongated porous carbon element of a predetermined length; and piercing the porous carbon element to provide a guide opening within and along the porous carbon element for a portion of the entire length of the porous carbon element.

9. A method in accordance with claim 7 wherein the step of providing a unitary metal current collector element comprises the steps of:

providing a flat metal blank of a resilient material and in the general shape of an hourglass, said blank having opposing pairs of corners and opposing pairs of sides tapering toward the center of the blank; and bending the metal blank at the central region thereof to form a pair of elongated spaced-apart, tapered, resilient spring members having spaced-apart free ends and defining a tapered central opening between the spring members and a generally V-shaped tapered form for the current collector element.

10. A method in accordance with claim 9 wherein:
the guide opening in the porous carbon element is generally circular in cross section; and
the step of providing the current collector element further comprises the step of:

bending the pairs of corners and sides of the metal blank toward each other in a manner to shape the elongated resilient members into generally arcuate configurations with the resilient members and the free ends of the resilient members being spaced apart from each other by gaps and the resilient members defining a generally conical opening therebetween.

11. A method in accordance with claim 7 wherein:
the feedthrough member is a hollow metal tube; and
further comprising the steps of:

introducing an electrolytic solution by way of the hollow feedthrough tube into the housing of the cell whereby electrolytic solution fills the central opening defined by the spring members of the current collector element and comes in contact with the porous carbon element by way of the spaces between the spring members.

12. A method in accordance with claim 11 wherein:
the porous carbon element is generally cylindrical in configuration; and
the anode structure and the porous separator are generally cylindrical in configuration and are arranged concentrically with each other and the cylindrical porous carbon element.

13. A method in accordance with claim 12 wherein:
the anode structure includes an oxidizable alkali metal; and
the electrolytic solution includes a reducible soluble cathode and an electrolyte soluble dissolved in the soluble cathode.

14. A method in accordance with claim 13 wherein:
the oxidizable alkali metal of the anode structure is lithium;
the reducible soluble cathode of the electrolytic solution is thionyl chloride; and
the electrolyte solute of the electrolytic solution is lithium tetrachloroaluminate.

* * * * *